TIME DIVISION MULTIPLEX MULTIPLE DIGIT STORE

Filed Feb. 23, 1962 4 Sheets-Sheet 1

INVENTOR.
WILLIAM F. BARTLETT
BY
George W. Killian
AGENT

Aug. 9, 1966 W. F. BARTLETT 3,265,815

TIME DIVISION MULTIPLEX MULTIPLE DIGIT STORE

Filed Feb. 23, 1962 4 Sheets-Sheet 3

TIME DIVISION MULTIPLEX MULTIPLE DIGIT STORE

Filed Feb. 23, 1962 4 Sheets-Sheet 4

United States Patent Office 3,265,815

Patented August 9, 1966

3,265,815

TIME DIVISION MULTIPLEX MULTIPLE DIGIT STORE

William F. Bartlett, Rochester, N.Y., assignor, by mesne assignments, to Stromberg Carlson Corporation, Rochester, N.Y., a corporation of Delaware Filed Feb. 23, 1962, Ser. No. 175,226

8 Claims. (Cl. 179—15)

This invention relates in general to time division multiplex signaling systems and, more particularly, to such systems wherein it is necessary to provide a store, or memory, of bits of information.

Although the invention herein disclosed is suitable for more general applications, it is particularly adapted for use in automatic telephone systems of the TDM type. In such systems, it is frequently necessary to be able to register information, such as the number dialed by the calling party. In the past, the registration of dialed digits has required the use of a plurality of groups of delay lines. More specifically, for the binary storage of decimal digits, a group of four delay lines are required for each digit to be stored.

It is, therefore, the general object of this invention to provide new, improved and more economical means for storing information in delay lines.

It is a more particular object of this invention to provide a single group of delay line registers which is adapted to register a plurality of digits all in a predetermined time slot of a repetitive time frame.

In accordance with the present invention, a counter comprising a plurality of delay lines is employed. Each delay line has a delay time equal to $n$ times the time of one time frame in the TDM system; where $n$ is the maximum number of digits that are to be registered. Therefore, any signal applied to the input of the delay line will appear as an output exactly $n$ time frames later. Accordingly, the single $n$-frame delay line may be used to register $n$ digits with each digit being registered within a predetermined time frame portion of the $n$-frame delay line. In order to route a time slot signal to the required portion of the $n$-frame delay line, an $n$-step ring counter, which is driven one step per time frame, is provided. In the illustrated embodiment of this invention, the output of the ring counter is a pulse of one time frame duration which is successively applied to $n$ output leads. In addition, an $n$-step counter is provided which is driven one step per digit to be registered, to produce a repetitive time slot pulse once per time frame in the time slot of the driving pulse. The output time slot pulses of the step counter are applied to a first output lead until the step counter is driven to its second step whereupon the repetitive time slot pulses are applied to a second output lead. Each advancement of the step counter causes the output pulses to be selectively applied to one of the $n$ output leads.

Corresponding output leads from the ring counter and the step counter are AND and gated to produce an output signal only when there is a coincidence of pulses on the corresponding leads. Since a time frame pulse appears on a given lead from the ring counter only every $n$ time frames and a time slot pulse appears at the output of the step counter every time frame, there will be coincidence only for one time slot every $n$-frames. Thus, with the step counter in its first position, a time slot pulse will be passed through an AND gate only once every $n$ time frames. When the step counter is in its second position, a time slot pulse will again be passed through an AND gate only once every $n$ time frames. However, the groups of pulses are separated by a number of time frames which is not an integer multiple of $n$. That is, the second group of pulses do not occur in the same time frames as the first group of pulses would have if they had continued.

In a similar manner, when the step counter is in its $n$th position, a time slot pulse will be passed through an AND gate only once every $n$ time frames and in frames in which no other group of pulses would have occurred if they had continued. Accordingly, the ring and step counters provide, in combination, a means for generating groups of time slot pulses in the time slot of the pulse driving the step counter, once per $n$ time frames with each group of pulses occurring in time frames which no other group of pulses would have occupied if they had continued.

The signal to be registered in the $n$-frame delay line is generated every time frame, by means well known to those skilled in the art and not forming a part of this invention, in the time slot of the pulse driving the step counter. Therefore, by AND gating the combined output signal of the ring and step counter with the signal to be registered, a signal can be routed to a controlled one of the $n$ time frames of the $n$-frame delay line. More specifically, each digit to be registered is sequentially routed to different time frame portions of the $n$-frame delay line.

Since a single group of delay lines is used for storing $n$ digits instead of $n$ groups of delay lines, as employed in the prior art, there is an obvious saving in the number and cost of delay lines employed.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings wherein:

FIGS. 1 and 2, when arranged as shown in FIG. 6, illustrate the invention in logic diagram form;

It is to be understood that only the details necessary to understand the invention have been shown. For example, it is believed that the inclusion of the circuit details of AND gates and other well known components would only tend to mask or obscure the invention. However, typical circuits for the AND gates, OR gates, amplifiers and inverters used herein may be seen in U.S. Patent No. 2,933,564, issued to J. G. Pearce et al. on April 19, 1960. In a similar manner, the circuit details of the ring counter and the step counters have been omitted inasmuch as counters of this type are well known to those skilled in the art, and any suitable counter may be employed.

*General description*

Figure 3:
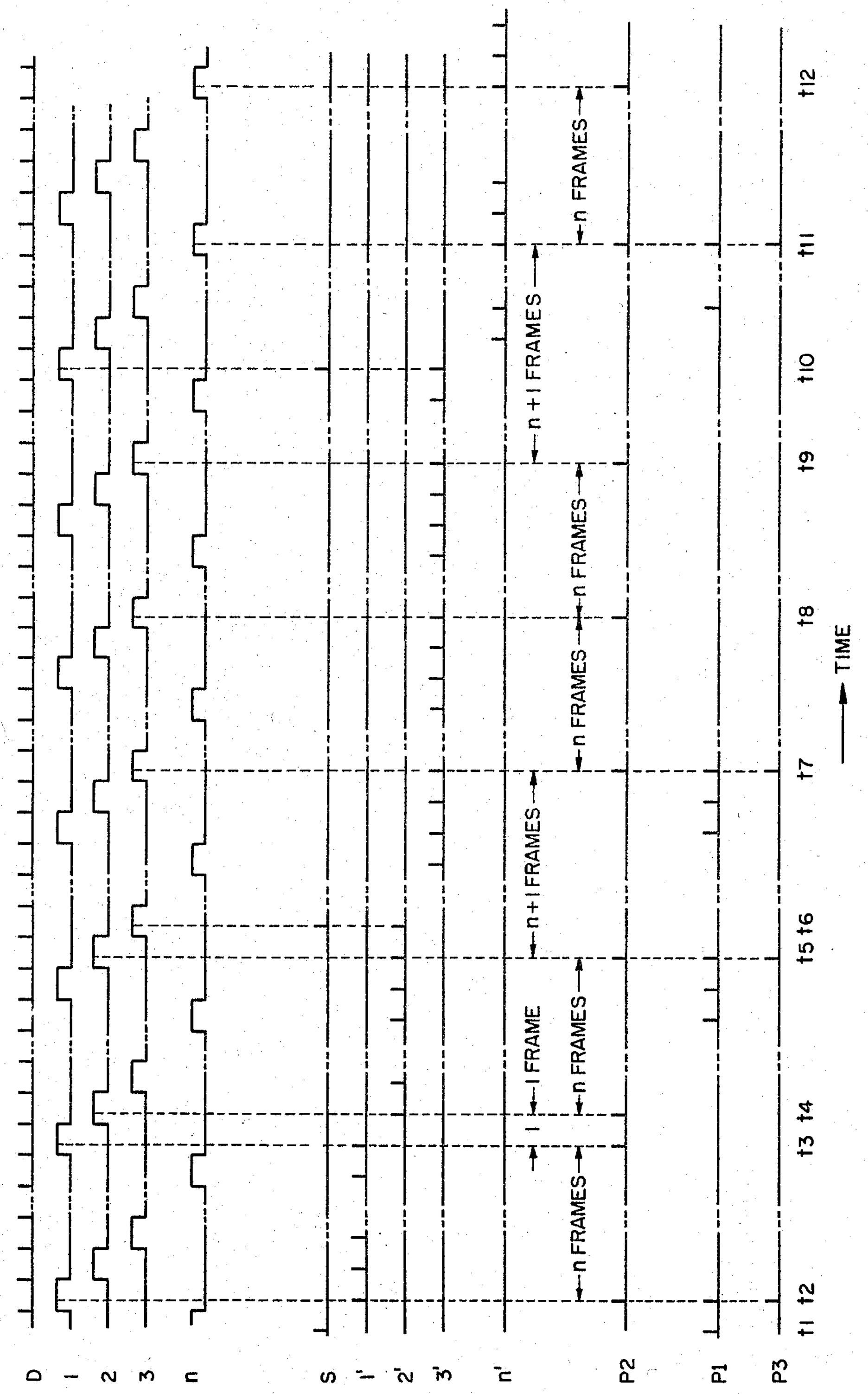
FIGS. 3 and 4 illustrate relationships between pulses appearing on various leads.

It is believed that the principles of this invention can best be understood by considering the relationships between the pulses appearing on various leads as illustrated in FIG. 3. The pulses indicated in the top row, row D, represent one microsecond pulse occurring every one hundred microseconds. More specifically, these pulses represent time slot pulses, in a given time slot, in a repetitive time frame. These time slot pulses are used to drive an $n$-step ring counter one step per pulse. In the illustrated embodiment, the ring counter has $n$ output leads and a one hundred microsecond output pulse is applied to one of the $n$ output leads for each step. More specifically, in response to each input pulse, a one hundred microsecond output pulse is selectively applied to one of the output leads. Therefore, any given output lead has a one hundred microsecond pulse applied thereto every $n$ time frames where each time frame is one hundred microseconds long. Accordingly, as may be seen in FIG. 3, the first drive pulse illustrated terminates the one hundred microsecond output pulse on output lead $n$ and initiates a one hundred microsecond output pulse on output lead 1. In a similar manner, the next drive pulse terminates the one hundred microsecond pulse on output lead 1 and initiates a one hundred microsecond pulse on output lead 2. In this manner, drive pulses applied to the ring counter cause a one hundred microsecond output pulse to be sequentially applied to the $n$ output leads with the output pulse occurring on any given output lead once every $n$ time frames.

In addition to the ring counter, which is driven one step per time frame, there is provided an $n$ step counter, which is driven at relatively infrequent and irregular intervals. The one microsecond pulses that drive the step counter are illustrated in the row designated S. It must be borne in mind that these pulses appear relatively infrequently and that, therefore, the ring counter may have counted through any number of cycles between any pair of successive step pulses. That is, it should not be inferred from FIG. 3 that the step pulses occur every cycle or so of the ring counter. The step counter, like the ring counter, has $n$ output leads. The pulses appearign on these $n$ output leads are illustrated in FIG. 3 on the lines designated 1', 2', 3' and $n'$. Although the one microsecond pulses which drive the step counter occur at irregular intervals, they do occur in a predetermined time slot. More specifically, as will be shown in the detailed description, the step pulse will occur in the same time slot as the signal to be registered. The step counter includes a plurality of one hundred microsecond delay line registers which recirculate the step pulse. Accordingly, the step pulse is regenerated to produce a group of one microsecond output pulses, spaced from each other by one time frame, in the time slot of the step pulse. After the first input step pulse, output pulses are applied to output lead 1'; and in response to the second input step pulse, output pulses are applied to output lead 2'. In a similar manner, the output pulses of the step counter are applied to successive ones of the $n$ output leads in response to successive input pulses. For example, if the first step pulse occurs at time $t1$, a group of output pulses will occur on output lead 1' in the same time slot as the step pulse, starting one time frame later. Therefore, output lead 1' has an output pulse once every time frame in the time slot of the step pulse until, at time $t3$, a second step pulse causes the output time slot pulses to be applied to output lead 2'. In a similar manner, at time $t6$, the output pulses on lead 2' are terminated and one time frame later they are initiated on output lead 3'. In this manner groups of output pulses are sequentially applied to each of the $n$ output leads of the step counter.

In summary, the ring counter produces pulses of one time frame duration once per $n$ time frames on each of its output leads; while the step counter produces groups of time slot pulses, once per time frame, on successive ones of its $n$ output leads. Therefore, if corresponding output leads from the ring counter and the step counter are compared, it will be observed that they have coincident pulses thereon for only one microsecond every $n$ time frames. For example, if output lead 1 of the ring counter and 1' of the step counter are compared, it will be observed that at the times $t2$ and $t3$, which are separated by exactly $n$ time frames, there are coincident pulses which are illustrated on line P2 of FIG. 3. Although not illustrated in FIG. 3, it should be appreciated that this coincidence of pulses on output leads 1 and 1' will occur several times between successive step pulses. In a similar manner, it will be observed that at times $t4$ and $t5$, output leads 2 and 2' have coincident pulses; and that at times $t7$ and $t8$, output leads 3 and 3' have coincident pulses. As will be shown in more detail in the detailed description, the cited coincident pulses will be applied to

P2 and successive pulses within each group of pulses will be separated by $n$ time frames.

In summary, the pulses illustrated in FIG. 3 on row P2 illustrate groups of time slot pulses, in the time slot of the step pulses which drive the step counter, with each pulse within the group separated by $n$ time frames from an adjacent pulse. The groups of pulses on lead P2 are separated by 1 or $n+1$ time frames. Thus, no group of pulses, if continued, would occur in the same time frames as any other group of pulses.

From this the number of time frames between an arbitrary starting time frame and the time frame of each pulse of each group may be computed. For example, if it is arbitrarily assumed that the first pulse of the first group starts two time frames after the arbitrary reference frame, it is evident that the second pulse of the first group will be $2+n$ frames from the reference frame since each pulse within a group is separated by $n$ frames. The third pulse of the first group will be $2+2n$ frames from the reference frame; and the last pulse of the first group will be $2+(L-1)n$ frames from the reference frame where L is the number of the last pulse. Since the second group of pulses start either $n$ or $n+1$ frames after the last pulse of the first group, it follows that the first pulse of the second group is either $3+(L-1)n$ or $3+Ln$ frames from the reference frame. L and $L-1$ are both integer numbers and therefore the general expression for the frame position of the first pulse of the second group from the reference frame is $3+na$ where "$a$" is the integer equal to either L or $L-1$, as the case may be. Furthermore, if the first pulse of the first group is assumed to be $x$ frames from the reference frame (instead of 2) it will be evident that the first pulse of the first group is $x+na$ frames from the reference, where "$a$" is now the integer zero and $x$ is the integer 2. The first pulse of the second group is $x+na$ from the reference where "$a$" is either L or $L-1$, as stated above and $x$ is 3. In the illustrated example, each first pulse of each group will be found to be $x+na$ frames from the reference where $x$ increases by one for each successive group and "$a$" increases by an integer equal to at least the number of pulses in the preceding group. If desired, another embodiment of the present invention could be provided in which the integer value of $x$ would not have to increase by one each time. However, the value of $x$ for each first pulse would be required to have a value that differs from that for any other first pulse.

The time slot pulses representing the information which it is desired to register are illustrated in FIG. 3 in the row designated P1. It should be recalled that in accordance with the invention the signals to be registered will be registered in a group of delay line registers, each of which has a delay time equal to $n$ times the time of one time frame in the TDM system; where $n$ is the maximum number of digits to be registered. The pulses on lead P1 are in the same time slot as the step pulses which drive the step counter; or more accurately stated, the step pulses are in the same time slot as the pulses on lead P1. Accordingly, there can be a coincidence of pulses on leads P1 and P2. When such coincidence is detected, a pulse is routed on lead P3 into the group of $n$ frame delay line registers where it is recirculated once every $n$ time frames; and the recirculating pulse on lead P1 is inhibited. Any subsequent pulse on lead P1 will, when coincident with a P2 pulse, generate a P3 pulse which will be routed to the group of $n$ frame delay line registers. In this manner, a series of pulses on lead P1 may be registered in a predetermined time slot in a predetermined time frame portion of the group of $n$ frame delay line registers. Subsequent to the registration of the last pulse in a particular series of pulses on lead P1, the step counter is advanced one step and a second group of pulses, each separated by $n$ time fames from an adjacent pulse, are applied to lead P2. It must be recalled that although each of the pulses in each group of pulses on lead P2 are separated by $n$ time frames, the groups of pulses are separated by 1 or $n+1$ time frames. That is, the groups of P2 pulses are separated by a number of time frames which is not an integer multiple of $n$. When there is another coincidence of pulses on leads P2 and P1, another pulse will be registered in the group of $n$ frame delay line registers which is separated from the first pulse in the $n$ frame delay line registers by exactly one time frame. In this manner, successive digits to be registered may be registered in a predetermined time slot in successive time frames of the group of $n$ frame delay line registers.

Figure 4:
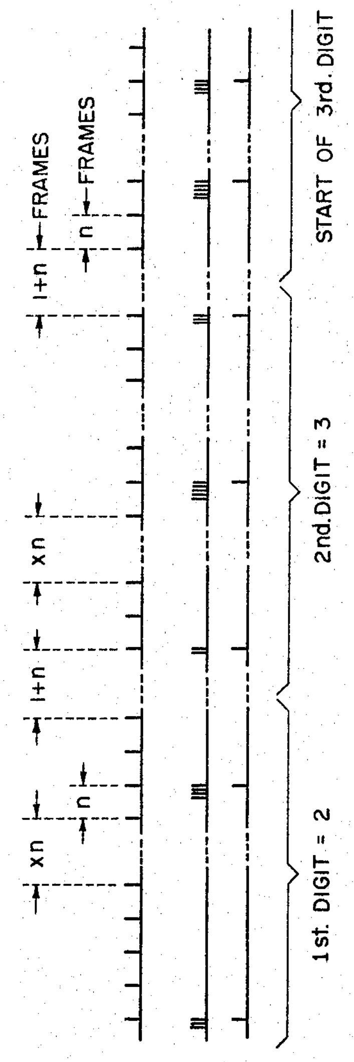

It is believed that the foregoing may be further clarified by considering a practical application of the invention. As already suggested, this invention might find application in TDM telephone systems. In such systems, it is frequently necessary to register digital information which may originate in pulse form from a telephone dial, that is, each digit dialed will generate a square wave having a number of pulses corresponding to the magnitude of the digit dialed. By means not shown in this application, since it does not form a part of this invention, each pulse of the square wave may be represented by a group of time slot pulses once per time frame in the time slot assigned to the calling line. One pulse from each group may be gated into a recirculating delay line register having a delay time of one time frame. That is, there will be as many single pulses gated into the delay line as the number of pulses in the digit dialed. Since dials are operated at a speed of approximately ten pulses per second, there will be one time slot pulse gated into the said delay line once every hundred thousand microseconds. It must be remembered, however, that this single pulse is recirculated in the delay line once every time frame, that is, once every one hundred microseconds. These pulses are illustrated in FIGS. 3 and 4 as P1 pulses. As has already been shown, P2 pulses may be generated in the same time slot as the P1 pulses, but, only once every $n$ time frames, and when there is a coincidence of P1 and P2 pulses, the P1 pulse will be terminated and registered in the $n$ frame delay line register.

Referring now more particularly to FIG. 4, there is shown a row of P2 pulses which comprise first and second groups of pulses and the start of a third group of pulses. Each of the P2 pulses within a group is separated from an adjacent pulse in the group by $n$ time frames. In the preferred embodiment of the invention, each group of P2 pulses will be separated from an adjacent group by 1 or $n+1$ time frames. The generation of a group of P2 pulses is terminated by an end of digit signal. As stated, a time slot pulse representing a dialed pulse is generated once per time frame until there is a coincidence of a P1 and P2 pulse. Therefore, as shown in FIG. 4, if the first dialed digit is the digit 2, there will be two groups of P1 pulses on lead P1 during the time that there is one group of P2 pulses on lead P2. Because the groups of P1 pulses may be separated by approximately one hundred thousand microseconds, the time chart of FIG. 4 shows a break in order to conserve space. Sometime after the end of the last group of P1 pulses of the first digit, the P2 pulses will terminate and a new group of P2 pulses will be generated starting 1 or $n+1$ time frames later. Since a P1 pulse cannot be registered in the $n$ frame delay line until it coincides with a P2 pulse, it means that any P1 pulse registered in the $n$ frame delay line, when it coincides with a P2 pulse, will be displaced by one time frame from a P1 pulse that was registered in the $n$ frame delay line when it coincided with a P2 pulse in the preceding group of P2 pulses. Accordingly, each digit of the dialed digits may be recorded in the same time slot but in a different time frame portion of the $n$ frame delay line. The number of P1 pulses that occur before there is a coincidence between a P1 pulse and a P2 pulse is a matter of chance. However, the number cannot exceed $n$, of course.

For ease of computation and manipulation, decimal digits are usually registered in a binary form. Therefore, the group of $n$ frame delay line registers in the illustrated embodiment of this invention includes four delay lines inasmuch as not more than ten consecutive pulses will have to be registered.

Figure 5:
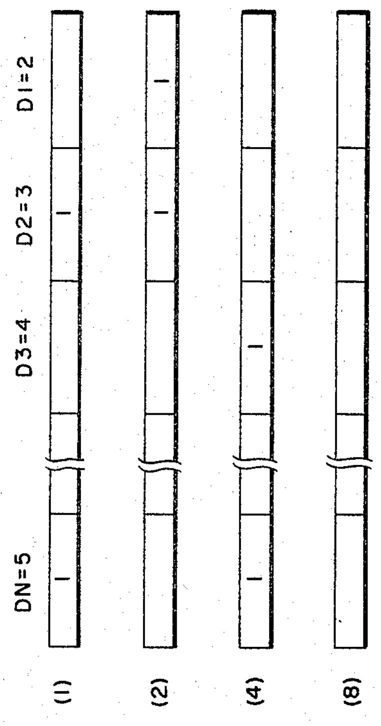
FIG. 5 illustrates a typical storage pattern of digital information in binary form in a group of $n$-frame delay lines.

FIG. 5 illustrates the four $n$ frame delay lines with each delay line divided into $n$ time frame portions. If the first, second, third and $n$th digit registered in the group of $n$ frame delay lines are 2, 3, 4 and 5, respectively, then pulses will be registered in the different delay lines as illustrated. More specifically, the digit 2 will be a single pulse in the appropriate time slot and first time frame portion of the second delay line; and the digit 3 will be registered as a pulse in the same time slot in the second time frame portion of both the first and second delay lines; and the digit 4 will be a pulse on the same time slot in the third time frame portion of the third delay line while the digit 5 will be represented by pulses in the same time slot in the last time frame portion of the first and third delay lines. That is, the digits are registered in the standard binary code that is well known to those skilled in the art. For convenience, the code is reproduced below:

| Decimal Digit | Delay Lines | | | |
|---|---|---|---|---|
| | 8 | 4 | 2 | 1 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |

1=signal stored.
0=no signal stored.

It will be noted that when the delay line registers are designated 1, 2, 4 and 8, that the decimal digit registered equals the sum of the designations of the registers having a signal registered therein.

*Detailed description*

Figures 1, 6:
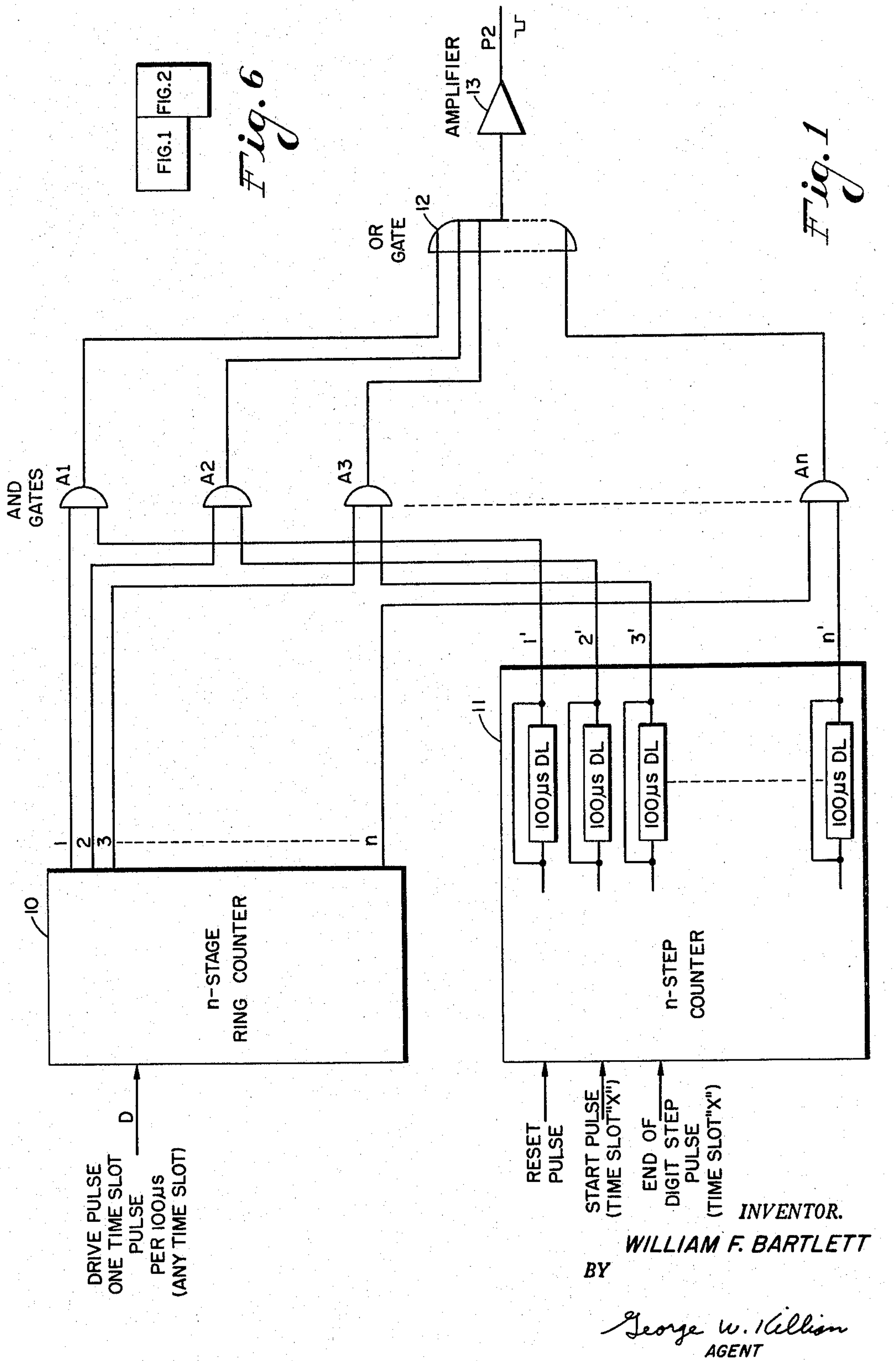
FIG. 6 shows how FIGS. 1 and 2 should be arranged.
Figure 2:
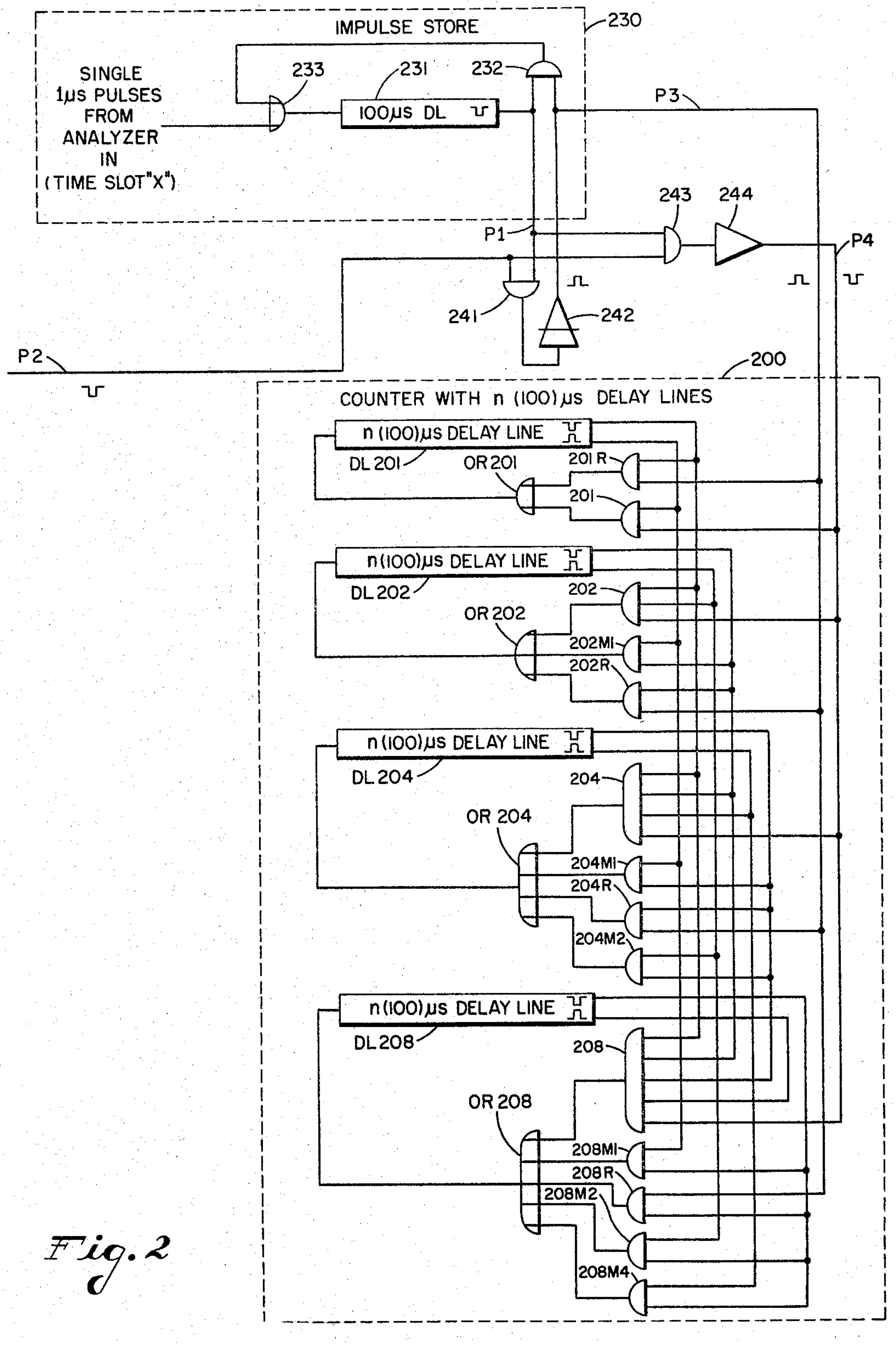

FIGS. 1 and 2, when arranged as shown in FIG. 6, illustrate one embodiment of this invention as it might be used in a TDM telephone system. In such systems, it is frequently necessary to register pulses, such as the pulses indicative of the digits dialed by a calling subscriber. By techniques which are well known to those skilled in the TDM art, and which do not form a part of this invention, it is possible to gate a single time slot pulse into an impulse store which is indicative of one pulse of a dialed digit. Accordingly, this invention contemplates the introduction of single time slot pulses into impulse store 230 for recirculation therein once per time frame until the pulse is extracted therefrom and registered in counter 200. Since dialed pulses occur at the rate of aproximately ten impulses per second, single time slot pulses will be gated into impulse store 230 approximately once every one hundred thousand microseconds. Of course, longer intervals representing the interdigit time will separate time slot pulses which are indicative of dialed pulses in different digits. A time slot pulse introduced into impulse store 230 will pass through OR gate 233 and be introduced into the one hundred microsecond delay line 231 and will appear at the output thereof one hundred microseconds later. The output pulse will appear as a negative pulse and will be applied to one of the input terminals of AND gate 232. The other input terminal of the AND gate will be at a negative potential as long as no pulse is being passed through AND gate 241 and inverter 242. Therefore, the output pulse will be recirculated in delay line 231. However, when an output pulse from delay line 231 coincides with a pulse on lead P2, a signal will be passed through AND gate 241 and inverter 242, thereby inhibiting AND gate 232 to prevent the recirculation of the pulse in delay line 231. The coincidence of the pulse from delay line 231 and the pulse on lead P2 will also cause a negative pulse to pass through AND gate 243 and amplifier 244 to counter 200. As will be shown, time slot pulses will occur on lead P2 once every *n* time frames in the same time slot as the pulse circulating in delay line 231, where *n* is equal to the maximum number of digits which are to be stored in counter 200.

In the illustrated embodiment of the invention, counter 200 is a binary counter which employs a plurality of delay lines, each of which has a delay time equal to *n* times the time of one time frame where *n* is, of course, still the maximum number of digits which are to be registered in counter 200. Accordingly, each of the delay lines DL201, DL202, DL 204 and DL208 may be thought of as a delay line having *n* time frame portions. It will be shown that each digit to be registered is registed as a time slot pulse in a different time frame portion of each of these delay lines. Although only four delay lines are shown in counter 200, more or less might be used depending upon the maximum number of consecutive pulses which are to be registered as a single digit. With four delay lines and binary registration, not more than $2^4$ or sixteen consecutive pulses may be registered. For example, let it be assumed that the first, second, third and *n*th digits to be registered are 2, 3, 4 and 5, respectively. In this case, for the first digit, a time slot pulse will be entered in delay line 231 and will be recirculated therein until it coincides with a pulse on lead P2, whereupon a pulse will be registered in counter 200 and the recirculation of the pulse in delay line 231 will be inhibited. Pulses will continue to be applied to lead P2 once every *n* time frames. Approximately one hundred thousand microseconds after the first pulse of the digit 2 was entered in delay line 231, the second pulse will be entered in delay line 231 and will be recirculated therein until it coincides with one of the pulses on lead P2, whereupon the second pulse is registered in counter 200 and the recirculation of the pulse in delay line 231 is inhibited. The relatively long interdigit time between digits will cause the cessation of the group of pulses on lead P2. Each pulse of a digit to be registered in counter 200 will appear as a positive and negative pulse on leads P3 and P4, respectively. The first negative pulse on lead P4 will partially enable AND gate 201, which is also enabled by delay line DL201 which has no output pulse at that time. All of the AND gates in counter 200 are of a type which will be enabled to pass a pulse only when all inputs are negative. Thus, the first pulse of the first digit will pass through AND gate 201 and OR gate OR201 to enter delay line DL201. *n* time frames later, the pulse will appear as a negative and positive pulse on the input upper and lower output leads, respectively, of delay line DL201. The output pulse will be recirculated by passing through AND gate 201R since the bottom enabling lead of AND gate 201R is at a negative potential when there is no output from inverter 242. The second pulse of the first digit will be gated to the counter 200 some whole integer multiple of *n* time frames after the first digit was gated to the counter 200. Therefore, both the first and second pulses of the first digit will be entered into the delay lines of counter 200 in the same time frame portion. The second pulse will cause AND gate 202 to be enabled to insert a pulse in delay line DL202. The upper input lead of AND gate 202 is enabled from the negative output pulse from DL201; the middle input lead of AND gate 202 is enabled from the negative signal at the lower output terminal of DL202, since no pulse is stored in this time slot; and the lower input terminal of AND gate 202 is enabled from the negative output signal of amplifier 244. At the same time that the second pulse is registered in DL202, the first pulse is inhibited from being recirculated in delay line DL201 because of the positive pulse on lead P3, which inhibits AND gate 201R.

The pulses representing the second digit to be registered in counter 200 will be gated to a different time frame portion of the delay lines in counter 200 because, as will be shown, the pulses on lead P2 will not occur an exact integer multiple of *n* time frames from the first group of P2 pulses.

In this manner, each of the successive groups of pulses representing the successive digits will be registered in a given time slot, but in different time frame portions of the delay lines in counter 200.

The delay line counter 200 could be a decimal counter; however, it is believed that it will usually be more economical to utilize a binary counter, as illustrated in FIG. 2. In binary counters, it is sometimes necessary to have pulses recorded in two or more of the delay lines and to inhibit the recirculation of pulses in one or more of the delay lines in response to successive input pulses. Pulses will be entered into delay lines DL201, DL202, DL204 and DL208 when their respective AND gates 201, 202, 204 and 208 are enabled by having all input leads at a negative potential. A pulse will be recirculated in a given delay line when its associated gate, with the suffix R, has its inputs negative A pulse will be maintained in a given delay line as a new input pulse is added when the associated AND gates, with the suffix M, are enabled by a negative output pulse from the delay line which corresponds to the numerical suffix following M. That is, for example, a pulse will be maintained in delay line DL208 when any one or more of AND gates 208M1, 208M2 or 208M4 has all of its inputs negative, which will occur only when delay line 208 already has an impulse stored therein and one or more of the delay lines DL201 DL202 or DL204 also has an impulse stored therein.

Although not illustrated in the drawings, the pulses recirculated in the delay lines are AND gated with clock pulses in order to reshape the pulse.

FIG. 1 illustrates a means for generating the pulses that are applied to lead P2. It should be understood that the pulses applied to lead P2, in the preferred embodiment of this invention, occur in groups with each pulse within a group separated from adjacent pulses by *n* time frames. However, the last pulse of one group and the first pulse of a successive group are separated from each other by either one or $n+1$ time frames. The box designated 10 represents an *n* stage ring counter, where *n* is, of course, the maximum number of digits to be registered in counter 200. The ring counter 10 has *n* output leads and is driven by a given repetitive time slot pulse one step per time frame. The ring counter 10 causes a pulse of one time frame duration to be applied to each of the *n* output leads in succession in such a manner that each output lead has the time frame pulse applied thereto once every *n* time frames and so that a pulse is applied to only one of the output leads at a time. FIG. 3 illustrates the time slot drive pulses for the ring counter on the line designated D, and the output pulses are illustrated on lines 1, 2, 3 . . . *n*.

The box designated 11 represents an *n* stage counter which is reset by a reset pulse before each use and which is then counted to its first position by a time slot pulse occurring in the same time slot as the pulses which are entered into delay line 231. Thereafter, the *n* step counter is advanced one step at the end of each dialed digit. The *n* step counter includes a plurality of delay lines which have a delay time of one time frame. There are *n* output leads designated 1′, 2′, 3′ and *n′*. When the *n* step counter has been advanced to its first position, time slot pulses will occur once per time frame, in the time slot of the stepping pulse, on output lead 1′. When the *n* step counter 11 is advanced to its second position, time slot pulses will occur once per time frame on output lead 2′, and so on.

Inasmuch as ring counters and step counters are well known to those skilled in the art, and any suitable ring and step counter might be used, the circuit details have not been included herein as it is believed that it would only tend to unnecessarily complicate the drawings and would tend to mask or obscure the invention.

Although the ring and step counters of FIG. 1 are illustrated as decimal counters, a practical application would probably employ binary counters in order to reduce the amount of equipment used. If binary counters are used, the counters will, of course, have fewer than $n$ output leads, and the binary equivalent of a given decimal number may be represented as a signal on one or more of the binary output leads. Naturally, this will require that AND gates A1 to A$n$ have a greater number of enabling leads. However, the ultimate pulses on lead P2 will be as illustrated in FIG. 3.

As may be seen from FIG. 1, the output lead 1 from the ring counter 10 and the output lead 1' from the step counter 11 are AND gated through gate A1. In a similar manner, the output leads 2 and 2' are AND gated through AND gate A2, etc. Accordingly, since a time slot pulse appears on output lead 1' once per time frame and a time frame pulse appears on output lead 1 once per $n$ time frames, there will be a coincidence once per $n$ time frames and, therefore, once every $n$ time frames a time slot pulse will be gated through gate A1. FIG. 3 illustrates, on line P2 at times $t2$ and $t3$, pulses which passed through gate A1. In a similar manner, when counter 11 is advanced to step 2, time slot pulses will be gated through AND gate A2 once every $n$ time frames. FIG. 3 illustrates, on line P2 at times $t4$ and $t5$, pulses which were gated through AND gate A2. In a similar manner, FIG. 3 illustrates, on line P2 at times $t7$, $t8$ and $t9$, pulses which were gated through AND gate A3. All of these pulses that pass through AND gates A1, A2, A3, etc., will pass through OR gate 12 and amplifier 13 to lead P2.

In summary then, groups of pulses are gated to lead P2 with each pulse within a group separated from adjacent pulses by $n$ time frames; the separation being determined by ring counter 10. As already stated, the last pulse of one group of pulses on lead P2 is separated from the first pulse of the succeeding group of pulses by either one or $n+1$ time frames. This separation is controlled by the fact that the time slot pulses from counter 11 are gated to lead P2 with a different one of the output leads from ring counter 10.

From the foregoing, it will be obvious that pulses introduced into delay line 231 and gated with pulses from a first group of pulses on lead P2 will be registered in a predetermined time frame portion of the delay lines in counter 200. In a similar manner, pulses representing another digit which are gated from delay line 231 and with another group of pulses on lead P2 will be registered in a different predetermined time frame portion of the delay lines in counter 200. In a similar manner, the pulses for each of the $n$ digits that are to be registered will be registered in a different predetermined time frame portion of the delay lines in counter 200. However, each pulse is registered in the same time slot of each time frame portion and the time slot is the same time slot as that assigned the calling line.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a time division multiplex system, first and second pulse sources, means for said first source to generate a time slot pulse in the time of a specific time slot in each of the repetitive time frames, means for said second source to generate a time slot pulse in the time of said specific time slot only in the time of every $n$th time frame, where $n$ is any integer greater than 1, and means responsive to coincident pulses from said first and second sources in the time of said specific time slot for terminating the generation of said pulses from said first source.

2. In a time division multiplex system, first and second pulse sources, means for said first source to generate a time slot pulse in the time of a specific time slot in each of the repetitive time frames, means for said second source to generate a time slot pulse in the time of said specific time slot only in the time every $n$th time frame, where $n$ is any integer greater than 1, a counter having delay line signal storage elements each having a delay time of $n$ times the time of said time frame, and means responsive to coincident pulses from said first and second sources for gating a time slot signal into at least one of said delay lines of said counter.

3. The combination set forth in claim 2 wherein the sginal gated to said delay line is registered in said delay line in said specific time slot in a time frame portion of said delay line which corresponds to the time frame in which the pulses from said second source are generated.

4. The combination set forth in claim 3 wherein the generation of said pulses from said first source is terminated when coincident pulses from said first and second sources are gated to said counter.

5. In a time division multiplex system, first and second pulse sources, means for said first source to generate a time slot pulse in the time of a specific time slot in each of the repetitive time frames, means for said second source to selectively generate groups of time slot pulses in the time of said specific time slot where each pulse in a group is separated from an adjacent pulse by $n$ time frames, where $n$ is a fixed integer, and with the first pulse within each group of pulses starting in a time frame which occurs $x+na$ frames after an arbitrary reference frame where $x$ is any integer from 1 to $n-1$ inclusive and $a$ is an integer, and with $x$ and $a$ having a different value and an increasing value, respectively, for each successive group of pulses, a counter having delay line signal storage elements with a delay time of $n$ times the time of said time frame, and means responsive to coincident pulses from said first and second sources for gating a signal into at least one of said delay lines of said counter.

6. The combination set forth in claim 5 wherein the signal gated to said delay line is registered in said delay line in said specific time slot in a time frame portion of said delay line which corresponds to the frame in which the pulses from said second source are generated.

7. The combination set forth in claim 6 wherein the generation of said pulse from said first source is terminated when coincident pulses from said first and second sources are gated to said counter.

8. The combination set forth in claim 5 wherein said second pulse source comprises an $n$ stage ring counter driven one step per time frame for generating output pulses of one time frame duration, an $n$ step counter driven a step at a time in response to input signals occurring in said specific time slot, said $n$ step counter having a recirculating delay line for repeating said input signal in said specific time slot in each time frame, and gating means in said second pulse source for passing a signal therethrough only when said ring counter and said $n$ step counter have coincident output pulses and the step counter is $x$ steps from its starting position while the ring counter is $x$ steps from a predetermined step in the ring, where $x$ is any integer not greater than $n$.

References Cited by the Examiner

UNITED STATES PATENTS

| | | | |
|---|---|---|---|
| 2,921,137 | 1/1960 | Morris et al. | 179—15 |
| 3,029,311 | 4/1962 | Ward | 179—15 |
| 3,069,304 | 11/1962 | Dawson | 179—15 |

DAVID G. REDINBAUGH, *Primary Examiner.*

T. E. KEOUGH, R. L. GRIFFIN, *Assistant Examiners.*